US008053048B2

(12) United States Patent
Lang et al.

(10) Patent No.: US 8,053,048 B2
(45) Date of Patent: Nov. 8, 2011

(54) OVERPOUCH FILM AND CONTAINER AND METHOD OF MAKING SAME

(75) Inventors: Michael T. K. Lang, Vernon Hills, IL (US); Angeles Lillian Buan, Crystal Lake, IL (US); Teresa L. White, Natick, MA (US); Varsha Kalyankar, Round Lake Beach, IL (US); Gregg Nebgen, Burlington, WI (US); Scott Edwards, Libertyville, IL (US); Kuo Zong Hong, Lake Zurich, IL (US)

(73) Assignees: Baxter International Inc., Deerfield, IL (US); Baxter Healthcare SA, Glattpark (Opfikon) (CH)

( * ) Notice: Subject to any disclaimer, the term of this patent is extended or adjusted under 35 U.S.C. 154(b) by 1074 days.

(21) Appl. No.: 11/114,517

(22) Filed: Apr. 25, 2005

(65) Prior Publication Data

US 2006/0240204 A1 Oct. 26, 2006

(51) Int. Cl.
*B32B 1/08* (2006.01)
*B32B 1/02* (2006.01)

(52) U.S. Cl. ............. 428/35.2; 428/34.1; 428/34.2; 428/35.7; 428/35.9; 428/36.9

(58) Field of Classification Search .............. 428/35.2, 428/34.1, 34.2, 35.7, 35.9; 525/191
See application file for complete search history.

(56) References Cited

U.S. PATENT DOCUMENTS

| | | | |
|---|---|---|---|
| 4,087,587 A | 5/1978 | Shida et al. | |
| 4,130,535 A | 12/1978 | Coran et al. | 524/487 |
| 4,311,628 A | 1/1982 | Abdou-Sabet et al. | 524/447 |
| 4,732,926 A | 3/1988 | Faulkner | 524/447 |
| 4,833,194 A | 5/1989 | Kuan et al. | 524/525 |
| 5,071,686 A * | 12/1991 | Genske et al. | 428/35.7 |
| 5,086,121 A | 2/1992 | Hazelton et al. | |
| 5,110,685 A | 5/1992 | Cross et al. | |
| 5,635,262 A | 6/1997 | Best et al. | |
| 5,887,980 A | 3/1999 | May | 383/204 |
| 5,893,645 A | 4/1999 | May | 383/208 |
| 5,904,425 A | 5/1999 | May | 383/203 |
| 5,932,659 A * | 8/1999 | Bambara et al. | 525/240 |
| 5,948,826 A | 9/1999 | Terada et al. | 521/27 |
| 5,998,019 A | 12/1999 | Rosenbaum et al. | 428/345 |
| 6,207,277 B1 | 3/2001 | Shieh | |
| 6,331,586 B1 | 12/2001 | Thielen et al. | |

(Continued)

FOREIGN PATENT DOCUMENTS

EP 0337153 10/1989

(Continued)

OTHER PUBLICATIONS

International Search Report (4 pgs.).
Written Opinion of the International Searching Authority (5 pgs.).

*Primary Examiner* — Marc Patterson
(74) *Attorney, Agent, or Firm* — K&L Gates LLP (57) ABSTRACT

A polymer blend comprising a high density polyethylene and a surface enhancing polymer is provided. The surface enhancing polymer may be an elastomer such as an ethylene propylene diene monomer terpolymer. The polymer blend may be fabricated into articles such as a film or a flexible overpouch for storing, and transporting medical components. Overpouch films made from the blend advantageously do not wrinkle or deform medical components contained therein when the overpouch—medical component combination is autoclaved.

19 Claims, 5 Drawing Sheets

Macro-microscope surface image of
90% HDPE/10% thermoplastic elastomer film

U.S. PATENT DOCUMENTS

| | | | |
|---|---|---|---|
| 6,461,696 B1 | 10/2002 | Ling et al. | 427/453 |
| 6,621,655 B2 | 9/2003 | White et al. | 360/92 |
| 6,844,038 B2 | 1/2005 | Gollier et al. | 428/35.7 |
| 2003/0216518 A1* | 11/2003 | Tau et al. | 525/191 |
| 2005/0194060 A1* | 9/2005 | Houwaert et al. | 141/114 |

FOREIGN PATENT DOCUMENTS

| | | |
|---|---|---|
| EP | 0422770 | 4/1991 |
| EP | 1316356 | 6/2003 |
| JP | 02-298538 | 12/1990 |
| WO | 02/31049 * | 4/2002 |

* cited by examiner

Figure 1: Macro-microscope surface image of 100% HDPE film

Figure 2: Macro-microscope surface image of 90% HDPE/10% thermoplastic elastomer film Figure 3: Macro-microscope surface image of 80% HDPE/20% thermoplastic elastomer film Figure 4: Macro-microscope surface image of 70% HDPE/30% thermoplastic elastomer film

OVERPOUCH FILM AND CONTAINER AND METHOD OF MAKING SAME

BACKGROUND

In the medical field, flexible containers such as overpouches and dustcovers store, protect and transport medical components such as medical delivery systems for parenteral, pharmaceutical, flushes, nutrition, irrigating, respiratory therapy agents, dialysis, blood, blood products, renal, plasma derivatives, plasma expanders, blood substitutes, anti-coagulants, blood preservatives, and other therapeutic agents. As such, it is necessary for the overpouch container to be compatible with the medical component disposed therein. For example, the overpouch container requires appropriate optical transparency to enable the visual inspection of contaminants within the overpouch and/or the medical component, such as an IV solution bag. It is also necessary for the overpouch container to withstand the autoclaving or sterilization process without wrinkling the medical component, discoloring, and/or adhering to the medical component. Other desirable attributes for the overpouch container include easy access to the pouch's contents; abrasion, tear, puncture and flex-crack resistance; and a composition the allows heat sealability.

Conventional overpouch containers composed of high density polyethylene fail to provide all of the aforementioned desirable properties. For example, when high density polyethylene overpouches containing a medical component are autoclaved (i.e., exposed to steam at temperature of about 121° C. and elevated pressure), the overpouch tends to wrinkle the medical component disposed therein. Traditional polyvinyl chloride (PVC) is also an unfavorable material for overpouch films. PVC generates objectionable amounts of hydrogen chloride upon incineration. In addition, PVC materials typically contain plasticizers that may leach into drugs, biological fluids or tissues that come in contact with the PVC material.

A need exists for a safe, clean, drug compatible, and cost-effective composition that may be fabricated into an overpouch container having the aforementioned positive attributes. In particular, a need exists for an overpouch film material that does not wrinkle or deform a medical component disposed in the overpouch during the autoclave process.

SUMMARY

The present disclosure sets forth a polymer blend that may be fabricated into articles such as films and overpouch containers. Films and containers formed from the present blend—overpouches and dustcovers in particular—exhibit the advantageous quality of not wrinkling the medical component within overpouch during the autoclave process. The present blend may also be fabricated into an easy-to-open overpouch enabling easy insertion and removal of the medical component. Films made from the present blend further exhibit no excessive stress whitening; improved tear and flex crack resistance; improved impact resistance; ready extrudability; and heat sealability. The roughened surface texture of films/containers made from the present blend reduces or eliminates wrinkling of the medical component within the container during autoclaving by reducing the friction coefficient of the overpouch film. The roughened surface texture of the overpouch film further allows trapped air to escape the inner chamber of the container during the autoclave process. Both of these properties provide an overpouch film that does not wrinkle or deform the medical component within the overpouch during autoclaving.

The polymer blend includes a high density polyethylene (HDPE) and a surface enhancing polymer. The high density polyethylene may be present in an amount from about 70% to about 99% by weight of the blend and the surface enhancing polymer may be present in an amount from about 1% to about 30% by weight of the blend.

In an embodiment, the surface enhancing polymer may be selected from elastomers, polyolefins, polyamides, polycarbonates, polyesters, polyimides, polyurethanes, ethylene vinyl alcohol copolymers, ethylene vinyl acetate copolymers, ethylene copolymers, acrylic acid copolymers, ethylene substituted acrylic acid copolymers, α-olefin substituted acrylic acid copolymers, styrene-ethylene/butylenes-styrene block copolymers and combinations thereof. In a further embodiment, the elastomer is an ethylene propylene diene monomer terpolymer. In yet a further embodiment, a polypropylene may be a component of the blend.

In an embodiment, a film formed from the blend having a thickness of about 2 mil to about 4 mil advantageously exhibits a puncture energy of from about 1.00 lb-in to about 4.00 lb-in, an impact energy from about 0.01 J/mil to about 0.70 J/mil, and a Trouser tear value from about 3.00 lbs to about 7.50 lbs.

In another embodiment, a container formed from the blend is provided. The container includes first and second flexible sheets comprising a polymeric blend of a high density polyethylene and a surface enhancing polymer and a seal disposed along a common peripheral edge of the first and second sheets. The seal may be either a permanent seal, a peelable seal or a combination thereof. The container includes an inner chamber suitable to accommodate and hold a medical component such as a medical delivery system as previously described. In a further embodiment, the container includes an inner seal formed between an inner portion of the first sheet and an opposing inner portion of the second sheet. The inner seal advantageously prevents movement of the medical device within the container.

A method of forming a flexible container is provided in another embodiment. The method includes providing a first sheet and a second sheet, each sheet composed of a blend of a high density polyethylene and a surface enhancing polymer. The second sheet is placed in opposing relation to the first sheet. The first sheet is then sealed to the second sheet along a common peripheral edge. The method may include placing a medical component within the container. In an embodiment, the method entails forming an inner seal between an inner portion of the first sheet and an opposing inner portion of the second sheet, the inner seal located proximate to the medical component. Placement of one or more inner seals near the medical component maintaining the medical component in a substantially stationary position or otherwise prevents movement of the medical component within the container.

Additional features and advantages of the present disclosure are described in, and will be apparent from, the following Detailed Description and the Figures.

DETAILED DESCRIPTION

While this disclosure sets forth embodiments in many different forms, and will herein be described in detail, these embodiments are disclosed with the understanding that the present disclosure is to be considered as exemplifications of the principles of the invention and are not intended to limit the broad aspects of the invention to the embodiments illustrated.

The present disclosure is directed to a polymer blend comprising a high density polyethylene and a surface enhancing polymer. The blend may be fabricated into articles such as films, flexible sheets, devices, and flexible containers such as overpouches or dustcovers as will be discussed herein. The high density polyethylene (HDPE) may be an ethylene homopolymer or copolymer having a density greater than about 0.915 g/cc. Typical copolymers of ethylene contain about 10% or less of copolymerized α-olefins having 3 to 16 carbon atoms. In an embodiment, the density of the HDPE is from about 0.93 g/cc to about 0.96 g/cc. In a further embodiment, the HDPE has a density from about 0.943 g/cc to about 0.947 g/cc and a melt flow index from about 1.6 to about 5.0. The HDPE may be a metallocene polyethylene or a Ziegler-Natta catalyzed polyethylene as is commonly known in the art. Nonlimiting examples of suitable HDPE include EQUISTAR® M6211A, DOW® 8454N, and FINA® 7194.

In an embodiment, the HDPE constitutes from about 70% to about 99% by weight of the blend. In a further embodiment, the HDPE is present in an amount from about 85% to about 97% by weight of the blend. In yet a further embodiment, the HDPE constitutes from about 90% to about 97.5% by weight of the blend.

The surface enhancing polymer may be any material that will increase the surface roughness of the HDPE. With an increased surface roughness containers/films composed of the blend exhibit a reduced friction coefficient which reduces or substantially eliminates wrinkling of medical components disposed in the container during autoclaving. In addition this increased surface roughness enables air within the container to escape the inner volume of the container during autoclaving. The surface enhancing polymer further provides an increased impact energy to articles made from the blend while simultaneously maintaining desired flexibility, content compatibility, clarity, tear and abrasion resistance. Nonlimiting examples of suitable surface enhancing polymers include elastomers, polyolefins, polyamides, polycarbonates, polyesters, polyimides, polyurethanes, ethylene vinyl alcohol copolymers, ethylene vinyl acetate copolymers, ethylene copolymers, acrylic acid copolymers, ethylene substituted acrylic acid copolymers, α-olefin substituted acrylic acid copolymers, styrene-ethylene/butylene-styrene block copolymers and combinations thereof.

In an embodiment, the surface enhancing polymer is an elastomer. In a further embodiment, the elastomer is an ethylene propylene diene monomer terpolymer (EPDM). EPDM terpolymers typically contain small amounts of non-conjugated diene units pendent to the main propylene-ethylene chain. The diene units typically have from about 5 to about 10 carbon atoms. As is commonly known in the art, the amount of ethylene present in EPDM may range from about 30 to about 85 weight percent EPDM, or from about 40 to about 70 weight percent EPDM. Propylene may constitute from about 14 to about 70 weight percent EPDM, or from about 30 to about 60 weight percent EPDM. The non-conjugated diene may be present from about 0.2 to about 10 weight percent EPDM, or from about 1 to about 3 weight percent EPDM. Nonlimiting examples of suitable dienes include 1,4-hexadiene, pentadiene, dicyclopentadiene, vinyl norbornene, norbornene diene, and ethylidenenorbornene. The EPDM may be vulcanized or non-vulcanized as is commonly known in the art.

In an embodiment, the elastomer is a crosslinked EPDM rubber dispersed in a thermoplastic polyolefin matrix such as polyethylene or polypropylene, for example. This type of elastomer typically exhibits a Shore A Durometer Hardness Value from 35 to 85 (ASTM D2240) and a density from about 0.93 g/cc to about 0.95 g/cc (ASTM D792). Nonlimiting examples of this type of EPDM material includes the SANTOPRENE® 8000 series of elastomers produced by Advanced Elastomer Systems of Akron, Ohio USA. In a further embodiment, the elastomer includes a cross linked EPDM rubber in a polyolefin matrix and mineral oil.

In an embodiment, the surface enhancing polymer constitutes from about 1% to about 30% by weight of the blend. In a further embodiment, the surface enhancing polymer is present in an amount from about 3% to about 15% by weight of the blend. In yet a further embodiment, the surface enhancing polymer constitutes from about 2.5% to about 10% by weight of the blend. It is understood that the blend may or may not include only HDPE and surface enhancing polymer.

In yet a further embodiment, a polypropylene may be added to the HDPE and surface enhancing polymer blend. The polypropylene may be present in an amount of 0% up to and including about 10% by weight of the blend. In an embodiment, the polypropylene constitutes about 5% by weight of the blend. With the provision of polypropylene, the amounts of HDPE and/or surface enhancing polymer also present in the blend may be adjusted as desired. For example, in an embodiment the blend may include 10% by weight surface enhancing polymer, 5% by weight polypropylene, and 85% by weight HDPE. The blend may or may not include only HDPE, surface enhancing polymer, and polypropylene.

The HDPE, surface enhancing polymer, and optionally polypropylene may be blended, mixed or otherwise compounded in any suitable manner as is commonly known in the art. For example, solid particles of HDPE, surface enhancing polymer (and optionally polypropylene) may be dry blended together, melted and melt extruded into a desired shape, an article, a device, a film, or the like.

In an embodiment, the blend is formed into a film. The film may have any desired thickness. Film having a thickness from about 2.0 mils to about 10.0 mils have found advantageous applicability as flexible sheets in the construction of overpouches further discussed below. In an embodiment, proportions of each blend component may be added so that a film having a thickness from about 2.0 mils to about 4.0 mils has a puncture energy of from about 1.00 lb-in to about 4.00 lb-in, an impact energy from about 0.01 J/mil to about 0.70 J/mil, and a Trouser tear value from about 3.00 lbs to about 7.50 lbs. In a further embodiment, the film is substantially wrinkle-free when autoclaved. Autoclaving typically entails exposure (of the film) to a temperature of about 121° C. and a pressure of from about 27 psi to about 38 psi for one minute to about one or more hours. It is understood that the component proportions of the film may be adjusted as desired to provide a film having any combination of these properties.

Figure 1:
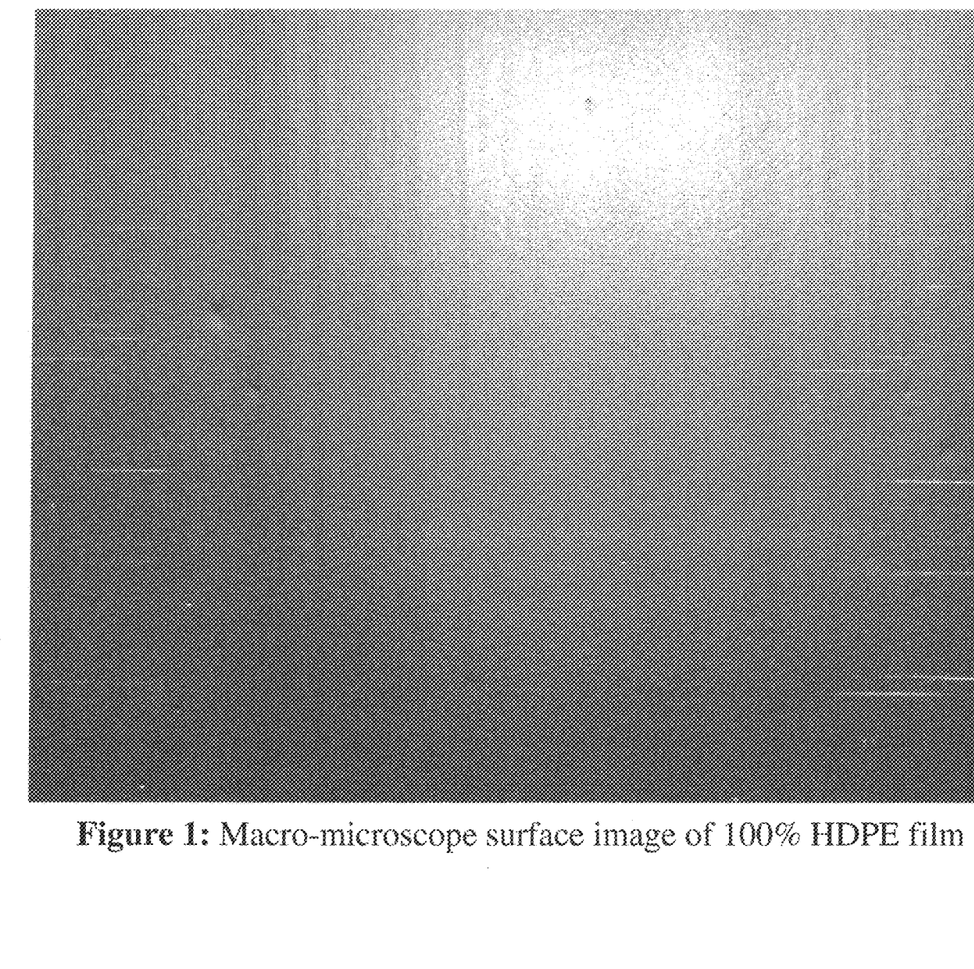
FIG. 1 is a macro-microscope surface image of 100% HDPE film.
Figure 2:
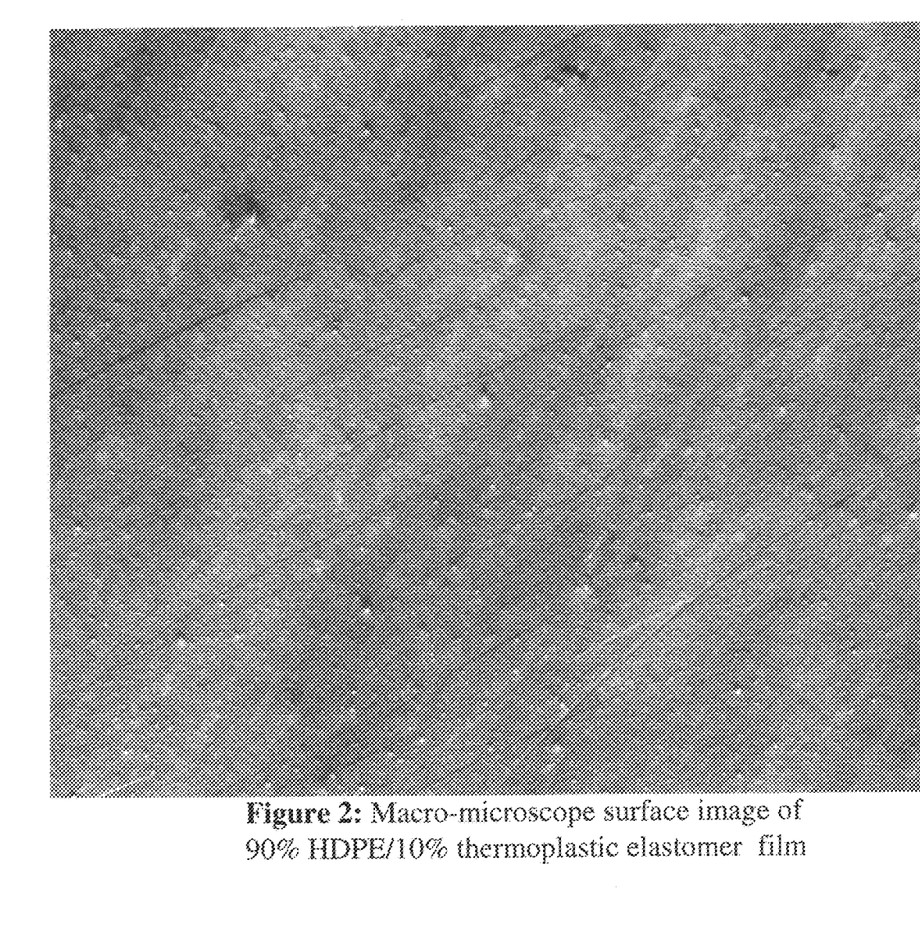
FIG. 2 is a macro-microscope surface image of 10% HDPE/90% elastomer film.
Figure 3:
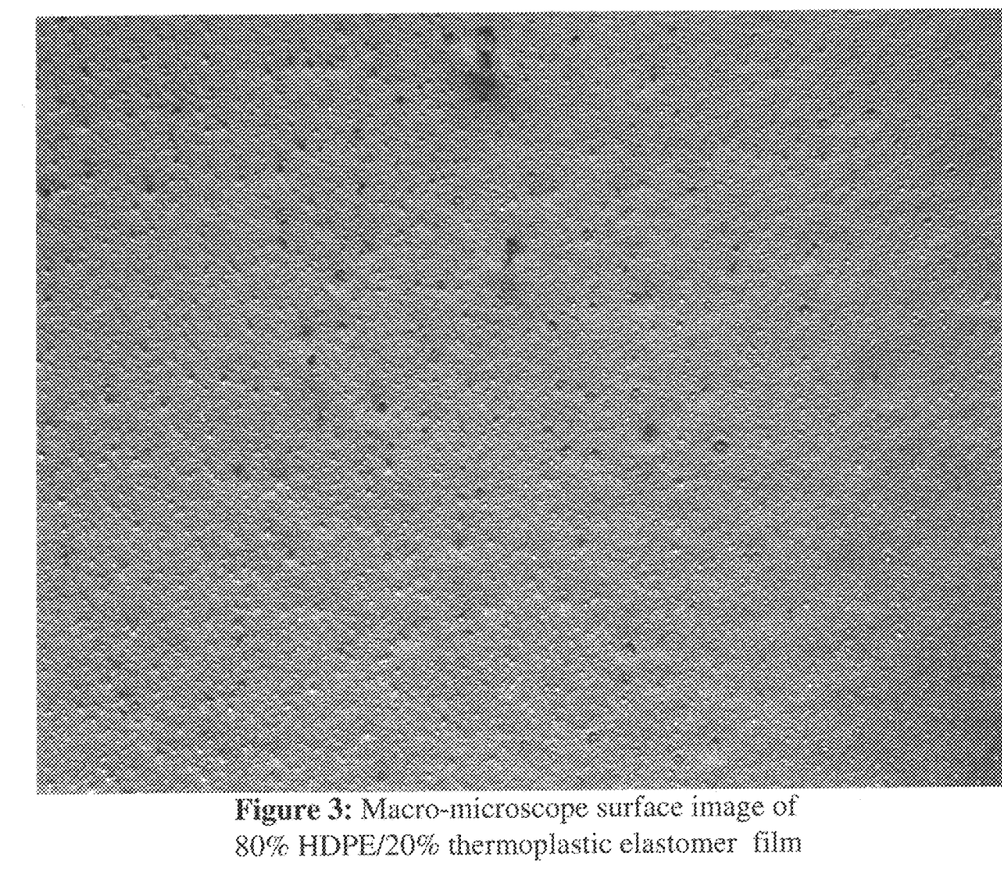
FIG. 3 is a macro-microscope surface image of 80% HDPE/20% elastomer film.
Figure 4:
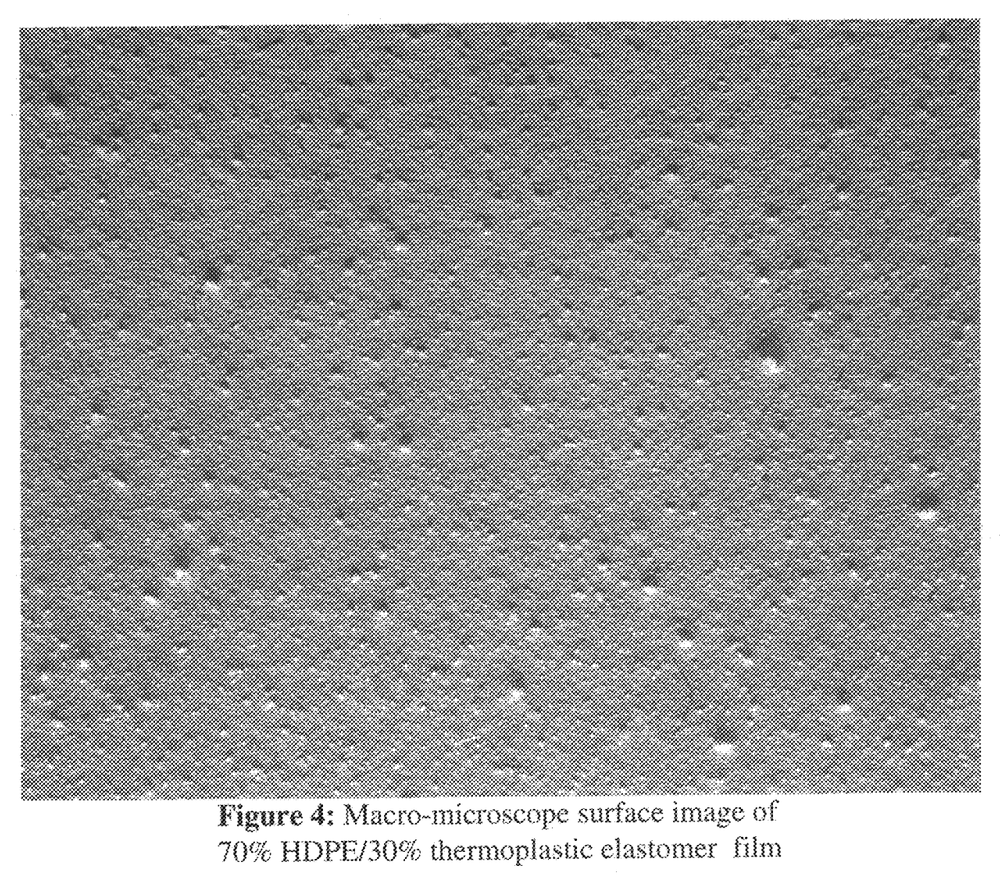
FIG. 4 is a macro-microscope surface image of 70% HDPE/30% elastomer film.

Addition of the surface enhancing polymer (and optionally the polypropylene) to the HDPE to form the present blend provides films with varying degrees of surface roughness when compared to an HDPE-only film. FIG. 1 shows a macro-microscope image of an HDPE-only film surface. FIGS. 2, 3, and 4 each show a macro-microscope image of a HDPE film surface with respective 10%, 20%, and 30% by film weight elastomer.

Figure 6:
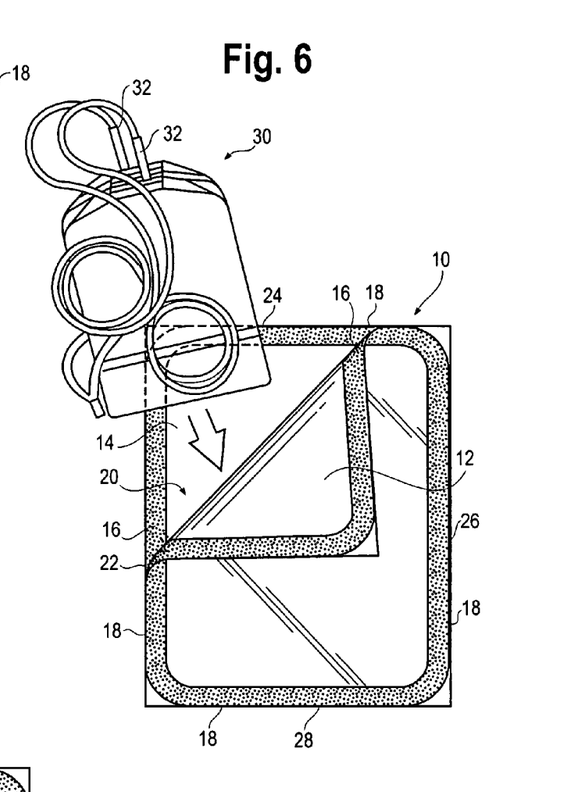
FIG. 6 is a plan view of a further embodiment of the container in an open arrangement and placement of a medical component within the container.

Profilometry (using a Leica M240 macroscope) was performed to show the increase in roughness associated with the addition of elastomer (SANTOPRENE®) to the dust cover film formulation. The results of profilometry experiments on the films shown in FIGS. 1-4 are set forth at Table 1. The peak counts (PC) and average roughness or height of the peaks in microns ($R_a$) were measured for the film blends in both the machine (extrusion) and transverse directions. $R_a$ is the arithmetic average roughness height, which is the average integral within one sampling length (1000 micro inches) and PC is the number of peaks which occur in this same range. The results show an increase in peak count and roughness when SANTOPRENE® is added to the film blend. Increased surface roughness advantageously enables dustcover films made from the present blends to slide against the medical component housed in the dustcover during the autoclave process. Thus, containers made from the present blends significantly reduce or eliminate adhesion between the dustcover and the medical component during autoclaving. Moveover, no wrinkling of the medical component occurs during autoclaving as a result of the overpouch. A further advantage of the blend is that the proportion of HDPE to surface enhancing polymer may be adjusted to obtain a film with a desired surface roughness.

combination of a permanent seal and a peelable seal. In other words, a portion of seal 16 may be a permanent seal while another portion of seal 16 may be a peelable seal. For example, the seal on side edge 22 and top edge 24 may be a peelable seal while the seal on side edge 26 and bottom edge 28 may be a permanent seal as shown in FIG. 6. In an embodiment, seal 16 is a peelable seal with an activation force from about 2N/15 mm to about 25N/15 mm.

Figure 7:
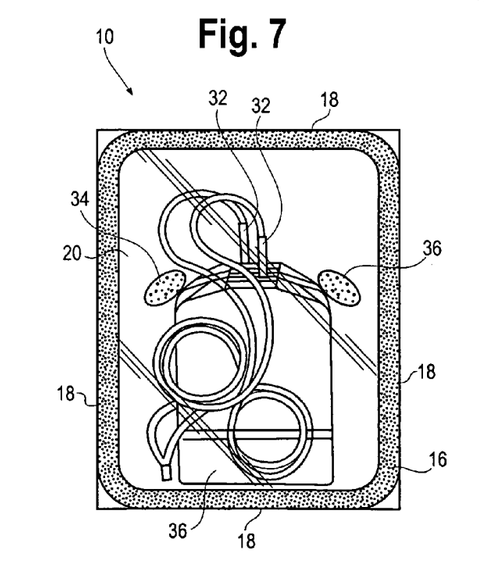
FIG. 7 is a plan view of a further embodiment of the container with the medical component disposed therein.

In another embodiment, container 10 may be used to store, deliver, or protect a medical component 30 as shown in FIGS. 6 and 7. Medical component 30 may be a medical delivery system (a solution bag, for example) as previously discussed, a tubing, a valve, any medical device that requires protection during shipment and/or storage, or any combination thereof. Container 10 is suitably sized so that chamber 20 provides a volume to accommodate medical component 30 when container 10 is sealed. Medical device 30 is then inserted into chamber 20 and seal 16 is formed to wholly enclose chamber 20 thereby protecting device 30 from the ambient environment.

It has been observed that port tubes 32 or similar protruding extensions of medical component 30 may distort during sterilization and/or autoclaving in the event such extensions are subjected to a force during these procedures. The extensions on many medical components, such as port tubes 32, will retain this distortion after sterilization and/or autoclaving is complete and as medical device 30 cools. The distortion force may result due to contact between seal 16 and port tubes 32 in combination with the force imposed upon port tubes 32 by the weight of device 30. Distortion may also occur if port tubes 32 are restricted in any way by the seal of container 10. Thus a potential distortion force may be imposed upon port tubes 32 if device 30 slides or otherwise moves to an end of container 10 to place port tubes 32 in restrictive contact with seal 16.

TABLE 1

Profilometry Results
(tested with n = 9 samples)

| Film | Machine Direction | | Transverse Direction | |
|---|---|---|---|---|
| | $R_a$ | Peak Count | $R_a$ | Peak Count |
| 100% Fina (Control Dust Cover) | 39.3 +/− 3.2 | 130.3 +/− 16.8 | 29.1 +/− 2.6 | 99.7 +/− 18.0 |
| 90/10% Fina/Santoprene | 41.0 +/− 3.3 | 120.7 +/− 10.9 | 38.8 +/− 4.6 | 129.7 +/− 18.1 |
| 80/20% Fina/Santoprene | 34.6 +/− 3.1 | 230.3 +/− 63.6 | 32.6 +/− 4.4 | 201.3 +/− 29.4 |
| 70/30% Fina/Santoprene | 39.3 +/− 6.2 | 247.0 +/− 72.6 | 45.5 +/− 6.3 | 218.7 +/− 59.8 |

Figure 5:
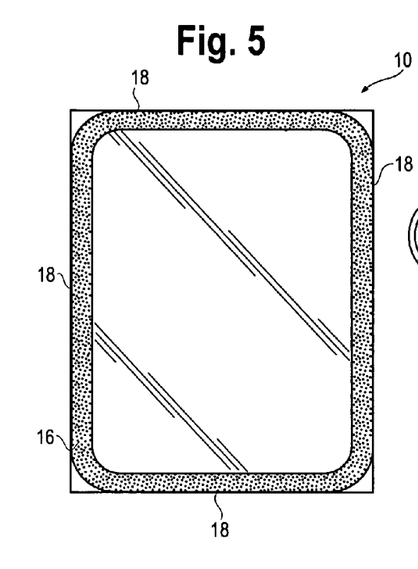
FIG. 5 is a plan view of a container as set forth in the disclosure.

In a further embodiment, the blend is used to form a container 10 as shown in FIGS. 5-7. Container 10 may be an overpouch as discussed above. Container 10 includes a first flexible sheet 12 and a second flexible sheet 14. First and second flexible sheets 12, 14 are composed of a blend of HDPE and surface enhancing polymer (and optionally polypropylene) as previously discussed. The polymeric blend of first sheet 12 may be the same or different than the polymeric blend of second sheet 14. Second sheet 14 is disposed in opposing relation to first sheet 12. A seal 16 extends along a common peripheral edge 18 of first and second sheets 12 and 14 to define an inner chamber 20 of container 10.

Seal 16 may be a permanent seal or a peelable seal as desired. Seal 16 may be formed by heat sealing, impulse sealing or a similar procedure as is commonly known in the art. The difference between a permanent seal and a peelable seal may be readily achieved by varying the heat sealing temperature and/or pressure of welding arms or by similar methods commonly known in the art. Seal 16 may also be a In an embodiment, container 10 includes an inner seal 34 that is formed between an inner portion of first sheet 12 and a corresponding opposing portion of second sheet 14 as shown in FIG. 7. Inner seal may be formed by way of any commonly known sealing procedure including the procedures for the formation of peripheral seal 16 discussed above. Inner seal 34 is positioned proximate to medical component 30 in order to maintain medical component 30 in a stationary position within chamber 20. In other words, inner seal 34 is positioned to prevent movement of medical component 30 within container 10. An additional number of inner seals may be formed as necessary, such as inner seal 36, for example. The shape and location of the inner seal(s) may be varied as desired in order to prevent movement of components disposed container 10, particularly during sterilization and autoclaving.

By way of example and not limitation, examples of the present invention will now be given.

EXAMPLE 1

Fina 7194 HDPE dust cover film was compared with a blend of 10% Santoprene 8201-60 (Industrial Grade) blended with 90% Fina 7194 HDPE. 1 L bags having 9.5 mil polymeric film were sterilized in the dust covers. Bags sterilized in Fina 7194 HDPE dust covers exited the autoclave as wrinkled bags. Wrinkling was eliminated when bags were sterilized in the Santoprene/Fina 7194 HDPE blend overpouch film. The same results were achieved when Santoprene 8271-55 (FDA grade) was used as the elastomer.

EXAMPLE 2

Fina 7194 HDPE dust cover film was compared with two other dust cover films having 5% or 10% Santoprene 8271-55 (FDA grade) blended with 95% or 90% Fina 7194 HDPE, respectively. It was also compared with four other dust cover films having 2.5%, 5.0%, 7.5%, and 10.0% Santoprene 8281-55 (Medical Grade) blended with Fina 7194 HDPE. Finally, it was compared with two films having 5% or 10% Santoprene 8281-45 in Fina 7194 HDPE. 1 L bags having 2 Layer "DD" polymeric film were sterilized in the dust covers. When sterilized in Fina 7194 HDPE dust covers, the bags were wrinkled. However, when bags were sterilized in the dust covers having the Santoprene/Fina 7194 HDPE blends, the wrinkling was alleviated or eliminated.

EXAMPLE 3

Fina 7194 HDPE dust cover film was compared with two other dust cover films having 5% or 10% Santoprene 8281-45 (Medical grade) blended with 95% or 90% Fina 7194 HDPE, respectively. 1 L bags having 2 Layer "DD" bag film were sterilized in the dust covers. When sterilized in Fina 7194 HDPE dust covers, the bags were wrinkled. However, when bags were sterilized in the dust covers having the Santoprene/Fina 7194 HDPE blends, the wrinkling was eliminated.

EXAMPLE 4

Fina 7194 HDPE dust cover film was compared with two other dust cover films having 5% or 10% Santoprene 8271-55 (FDA grade) blended with 95% or 90% Fina 7194 HDPE, respectively. It was also compared with four other dust cover films having 2.5%, 5.0%, 7.5%, and 10.0% Santoprene 8281-55 (Medical Grade) blended with Fina 7194 HDPE. Finally, it was compared with two films having 5% or 10% Santoprene 8281-45 in Fina 7194 HDPE. 1 L bags having 2 Layer "DD" polymeric film were sterilized in the dust covers. When sterilized in Fina 7194 HDPE dust covers, the bags were wrinkled. However, when bags were sterilized in the dust covers having the Santoprene/Fina 7194 HDPE blends, the wrinkling was alleviated or eliminated.

EXAMPLE 5

120 1 L bags were pouched in dust covers made with 5% Santoprene 8271-55 (FDA grade), 95% Fina 7194 HDPE film, 120 1 L bags were pouched in dust covers made with 10% Santoprene 8271-55 (FDA grade), 90% Fina 7194 HDPE film, and 120 1 L bags were pouched in dust covers made with 10% Santoprene 8281-55 (Medical grade), 90% Fina 7194 HDPE film. The bags were pouched, sterilized, pre-conditioned in hot, cold, and ambient environments, and subjected to distribution testing. The bags pouched in the dustcovers exhibited no wrinkling.

TABLE 2

| | Film Properties | | | | | | | |
|---|---|---|---|---|---|---|---|---|
| % Santoprene (grade) | 10 (8271-55) | 10 (8271-55) | 10 (8271-55) | 10 (8271-55) | 10 (8271-55) | 10 (8271-55) | 10 (8271-55) | 10 (8281-55) |
| % HDPE (brand, grade) | 90 (Fina, 7194) | 90 (Fina, 7194) | 90 (Fina, 7194) | 90 (Fina, 7194) | 90 (Fina, 7194) | 85 (Fina 7194) | 85 (Fina 7194) | 90 (Fina, 7194) |
| % Polypropylene (brand, grade) | 0 | 0 | 0 | 0 | 0 | 5 (Montel SG982) | 5 (Montel SG982) | 0 |
| Measured Thickness (mils) | 3.0 (+/−0.2) | 3.2 (+/−0.1) | 3.6 (+/−0.2) | 3.8 (+/−0.1) | 4.1 (+/−0.1) | 3.5 (+/−0.2) | 2.3 (+/−0.1) | 3.3 (+/−0.2) |
| MECHANICAL PROPERTIES | | | | | | | | |
| Trouser Tear - Peak Load (lb.) | | | | | | | | 5.98 (+/−0.55) |
| Haze - As Is (%) | 69.28 (+/−2.14) | | | | | 67.55 (+/−0.56) | 51.37 (+/−1.07) | 61.52 (+/−1.99) |
| Bulk Haze (%) | 29.83 (+/−1.78) | | | | | 41.43 (+/−1.20) | 25.73 (+/−0.60) | 38.59 (+/−3.31) |
| Puncture Energy (lb. * in.) | 2.59 (+/−0.24) | 2.79 (+/−0.44) | 2.93 (+/−0.75) | 2.13 (+/−0.44) | Sterilized: 1.84 (+/−0.28) Unsterilized: 3.39 (+/−0.43) | 2.20 (+/−0.33) | 2.44 (+/−0.62) | 2.12 (+/−0.10) |
| Impact Energy @ 5° C. (J/mil) | 0.14 (+/−0.02) | | | | | 0.19 (+/−0.05) | 0.26 (+/−0.09) | 0.34 (+/−0.06) |
| Ambient Impact Energy @ ~23° C. (J/mil) | 0.16 (+/−0.06) | 0.17 (+/−0.09) | 0.20 (+/−0.09) | 0.16 (+/−0.09) | | 0.23 (+/−0.07) | 0.20 (+/−0.04) | 0.34 (+/−0.06) |

TABLE 2-continued

Film Properties

| | | | | | | |
|---|---|---|---|---|---|---|
| % Santoprene (grade) | 10 (8281-45) | 10 (8281-55) | 10 (8281-55) | 10 (8281-55) | 15 | 20 |
| % HDPE (brand, grade) | 90 (Fina, 7194) | 85 (Fina, 7194) | 90 (Equistar M6211A) | 90 (Dow 8454N) | 85 | 80 |
| % Polypropylene (brand, grade) | 0 | 5 (Montel SR857) | 0 | 0 | | |
| Measured Thickness (mils) | 2.4 (+/−0.0) | 2.4 (+/−0.2) | 2.7 (+/−0.2) | 4.1 (+/−0.3) | | |
| MECHANICAL PROPERTIES | | | | | | |
| Trouser Tear - Peak Load (lb.) | 4.46 (+/−0.50) | 4.25 (+/−0.66) | 5.32 (+/−1.36) | 4.30 (+/−0.20) | | |
| Haze - As Is (%) | 66.61 (+/−0.83) | 57.18 (+/−2.14) | 63.94 (+/−1.45) | 49.88 (+/−0.70) | | |
| Bulk Haze (%) | 33.58 (+/−0.59) | 30.50 (+/−1.98) | 42.86 (+/−2.88) | 37.98 (+/−0.88) | | |
| Puncture Energy (lb. * in.) | 3.57 (+/−0.55) | 2.39 (+/−0.18) | 1.23 (+/−0.18) | 0.58 (+/−0.14) | | |
| Impact Energy @ 5° C. (J/mil) | | 0.22 (+/−0.06) | | | | |
| Ambient Impact Energy @ ~23° C. (J/mil) | 0.32 (+/−0.07) | 0.21 (+/−0.05) | 0.21 (+/−0.05) | 0.09 (+/−0.02) | | |

TABLE 3

Tensile Testing Summary
(Tested 20"/min with 2" gauge length, MD only)

| Film | Yield Stress (psi) | Break Stress (psi) | Elongation | Modulus (psi) |
|---|---|---|---|---|
| 100% Fina | 2760 +/− 160 | 7650 +/− 500 | 900 +/− 50 | 36400 +/− 11900 |
| 90/10% Fina/Santroprene | 2280 +/− 80 | 5720 +/− 360 | 710 +/− 30 | 29800 +/− 6300 |
| 80/20% Fina/Santoprene | 1800 +/− 40 | 5100 +/− 250 | 760 +/− 30 | 24500 +/− 4800 |
| Container Film PI2408-6 | 1580 +/− 40 | 6530 +/− 30 | 820 +/− 39 | 25700 +/− 2400 |

An Instron 5565 was set to a speed of 20"/min with a 2" gauge length for each film, a sample size of n=10 was tested. Samples were cut from the middle of each roll into 5" strips in the Machine Direction (MD). For each sample, Young's Modulus (PSI), Yield Stress (PSI), Tensile Stress (PSI), and Elongation (%) were calculated.

TABLE 4

Autoclave Adhesion Testing
(Autoclaved 30 min, 250° F. with 1.8 kg Weight)

| Film | n | Max Peel Load (lb) |
|---|---|---|
| 100% Fina (4 mil) | 10 | 0.075 +/− 0.031 |
| 90/10% Fina/Santoprene (4 mil) | 5 | 0.039 +/− 0.011 |
| 80/20% Fina/Santoprene (4 mil) | 8 | 0.031 +/− 0.007 |
| 70/30% Fina/Santoprene (4 mil) | 8 | 0.038 +/− 0.024 |
| Dust Cover (100% Fina) (3 mil) | 5 | 0.044 +/− 0.024 |

Autoclave Adhesion Testing

For each dust cover film, a sample size of n=10 was used. 10 strips measuring 1" wide were cut from each film. Each dust cover film was placed on top of a 1" strip of container film, then sandwiched between two sheets of Teflon. The samples were stacked with a 1.8 Kg weight pressed on top of the whole group. The sample strips were autoclaved for 60 minutes at 250 of F with 30 psig pressure. The cool down cycle was set at 60 minutes with 30 psig air overpressure. The Instron 5565 was set to a speed of 10"/min using a 20 lb load cell. The maximum peel load (lbs) was determined for each film.

TABLE 5

Trouser Tear Results
(100"/min, 2" gauge length)

| Film | Average Tear Energy (in * lb) | Ave Tear Load (lbs) |
|---|---|---|
| 100% Fina (4 mil) | 2.244 +/− 0.804 | 1.122 +/− 0.402 |
| 90/10% Fina/Santoprene (4 mil) | 2.210 +/− 0.584 | 1.150 +/− 0.317 |
| 80/20% Fina/Santoprene (4 mil) | 2.547 +/− 0.577 | 1.276 +/− 0.292 |
| 70/30% Fina/Santoprene (4 mil) | 1.843 +/− 0.551 | 0.921 +/− 0.026 |

Trouser Tear Test

The MTS hydraulics tensile tester was set to a speed of 100"/min with a 2" gauge length. A sample size of n=10 was used.

It should be understood that various changes and modifications to the presently preferred embodiments described herein will be apparent to those skilled in the art. Such changes and modifications can be made without departing from the spirit and scope of the present disclosure and without diminishing its intended advantages. It is therefore intended that such changes and modifications be covered by the appended claims.

We claim:

1. A polymer blend comprising:
   a high density polyethylene; and
   a surface enhancing polymer of a crosslinked ethylene propylene diene terpolymer dispersed in a polyolefin matrix.

2. The blend of claim 1 wherein the high density polyethylene is present in an amount from about 70% to about 99% by weight of the blend and the surface enhancing polymer is present in an amount from about 1% to about 30% by weight of the blend.

3. The blend of claim 1 wherein the blend further comprises a polypropylene.

4. The blend of claim 3 wherein the polypropylene is present in an amount up to about 10% by weight of the blend.

5. The blend of claim 1 wherein the blend further comprises a film having a thickness from about 2.0 mil to about 4.0 mil and a puncture energy of from about 1.00 lb-in to about 4.00 lb-in, an impact energy from about 0.01 J/mil to about 0.70 J/mil, and a Trouser tear value from about 3.00 lbs to about 7.50 lbs.

6. The blend of claim 5 wherein the film is substantially wrinkle-free when compared to a film lacking the surface enhancing polymer, the films exposed to a temperature of about 121° C. and a pressure of from about 27 psi to about 38 psi.

7. A container comprising:
   a first flexible single layer sheet comprising a polymeric blend of a high density polyethylene and a surface enhancing polymer;
   an opposing second flexible single layer sheet comprising a polymeric blend of a high density polyethylene and a surface enhancing polymer of an ethylene propylene diene terpolymer dispersed in a polyolefin matrix; and
   a seal disposed along a common peripheral edge of the first and second sheets.

8. The container of claim 7 wherein the seal further comprises a portion of the first flexible sheet welded to a portion of the second flexible sheet.

9. The container of claim 8 wherein the seal is a heat seal.

10. The container of claim 7 wherein a portion of the seal is a peelable seal.

11. The container of claim 10 wherein the peelable seal has an activation force from about 2N/15 mm to about 25N/15 mm.

12. The container of claim 7 wherein a portion of the seal is a permanent seal.

13. The container of claim 7 wherein the container defines a chamber, the container further comprising a medical component disposed within the chamber.

14. The container of claim 13 further comprising an inner seal between an inner portion of the first sheet and an opposing inner portion of the second sheet, the inner seal located in the chamber and preventing movement of the medical component within the chamber.

15. The blend of claim 1 wherein the blend further comprises a film having an average roughness ($R_a$) value from about 32 to about 45.

16. The blend of claim 15 wherein the film has a peak count value from about 120 to about 247.

17. A single layer film comprising:
   a high density polyethylene; and
   a surface enhancing polymer of a crosslinked ethylene propylene diene rubber dispersed in a polyolefin matrix, the film having an average roughness ($R_a$) value from about 32 to about 45 and a peak count value from about 120 to about 247.

18. The container of claim 13 further comprising a plurality of inner seals proximate to the medical component in the chamber, the inner seals maintaining the medical component in a stationary position within the chamber.

19. The container of claim 13 wherein the medical component is undistorted after the container has been autoclaved.

* * * * *

UNITED STATES PATENT AND TRADEMARK OFFICE
CERTIFICATE OF CORRECTION

| | | |
|---|---|---|
| PATENT NO. | : 8,053,048 B2 | Page 1 of 1 |
| APPLICATION NO. | : 11/114517 | |
| DATED | : November 8, 2011 | |
| INVENTOR(S) | : Ling et al. | |

It is certified that error appears in the above-identified patent and that said Letters Patent is hereby corrected as shown below:

On the Title Page of the patent listing item 75 the inventors, replace "Michael T.K. Lang" with -- Michael T.K. Ling --.

Signed and Sealed this
Twentieth Day of December, 2011

David J. Kappos
*Director of the United States Patent and Trademark Office*